(12) United States Patent
Usui et al.

(10) Patent No.: US 10,849,057 B2
(45) Date of Patent: Nov. 24, 2020

(54) COMMUNICATION SYSTEM THAT CHANGES NETWORK SLICE, COMMUNICATION DEVICE THAT CHANGES NETWORK SLICE, AND PROGRAM THAT CHANGES NETWORK SLICE

(71) Applicant: KDDI CORPORATION, Tokyo (JP)

(72) Inventors: Takeshi Usui, Tokyo (JP); Yoshinori Kitatsuji, Tokyo (JP)

(73) Assignee: KDDI CORPORATION, Tokyo (JP)

( * ) Notice: Subject to any disclaimer, the term of this patent is extended or adjusted under 35 U.S.C. 154(b) by 0 days.

(21) Appl. No.: 16/329,594

(22) PCT Filed: Sep. 8, 2017

(86) PCT No.: PCT/JP2017/032511
§ 371 (c)(1),
(2) Date: Feb. 28, 2019

(87) PCT Pub. No.: WO2018/061713
PCT Pub. Date: Apr. 5, 2018

(65) Prior Publication Data
US 2019/0200286 A1      Jun. 27, 2019

(30) Foreign Application Priority Data

Sep. 28, 2016   (JP) .................. 2016-189477

(51) Int. Cl.
*H04W 48/18*       (2009.01)
*H04W 28/08*       (2009.01)
(Continued)

(52) U.S. Cl.
CPC ............. *H04W 48/18* (2013.01); *H04W 8/20* (2013.01); *H04W 8/26* (2013.01); *H04W 28/08* (2013.01);
(Continued)

(58) Field of Classification Search
CPC ....... H04W 48/18; H04W 8/20; H04W 36/12; H04W 28/08; H04W 92/14; H04W 48/17; H04W 8/26; H04W 80/10; H04W 36/0011

See application file for complete search history.

(56) References Cited

U.S. PATENT DOCUMENTS 9,392,471 B1     7/2016   Thomas et al.
2015/0055623 A1  2/2015   Li et al.
(Continued)

FOREIGN PATENT DOCUMENTS

CN     101860471 A     10/2010
CN     105813195 A     7/2016

OTHER PUBLICATIONS

"3rd Generation Partnership Project; Technical Specification GroupServices and System Aspects; Study on Architecture for Next GenerationSystem(Release 14)", 3GPP TR23.799, 2016, pp. 56-71, 87-90.

(Continued)

*Primary Examiner* — Walli Z Butt
(74) *Attorney, Agent, or Firm* — Greenblum & Bernstein, P.L.C.

(57) ABSTRACT

A communication system includes a slice selector that selects a second network slice, to which a first network slice to which a terminal device is connected is to be switched, from a multiple network slices respectively including a multiple network functions, a creator that creates setting information used in communication between the terminal device and the first network slice, a notification unit that notifies the second network slice of the setting information created by the creator, and a session manager (SM) function instance that is included in the second network slice and that (Continued)

determines a route on which traffic is to be transferred, using the setting information notified of by the notification unit.

9 Claims, 8 Drawing Sheets

(51) Int. Cl.
  *H04W 92/14* (2009.01)
  *H04W 48/00* (2009.01)
  *H04W 8/26* (2009.01)
  *H04W 80/10* (2009.01)
  *H04W 8/20* (2009.01)
  *H04W 36/12* (2009.01)

(52) U.S. Cl.
  CPC ............ *H04W 36/12* (2013.01); *H04W 48/17* (2013.01); *H04W 80/10* (2013.01); *H04W 92/14* (2013.01)

(56) References Cited

U.S. PATENT DOCUMENTS

| | | | |
|---|---|---|---|
| 2015/0131612 A1 | 5/2015 | Elliott | |
| 2017/0318450 A1* | 11/2017 | Salkintzis | H04W 76/14 |
| 2018/0206152 A1* | 7/2018 | Zhang | H04M 15/66 |
| 2018/0359688 A1* | 12/2018 | An | H04W 48/10 |
| 2019/0313467 A1* | 10/2019 | Fujishima | H04L 47/78 |

OTHER PUBLICATIONS

NGMN Alliance, "Description of Network Slicing Concept Version 1.0", NGMN Alliance, Jan. 13, 2016.
"Solution on network slice instance reselection", LG Electronics Inc., Sep. 3, 2016.
International Search Report issued in International Bureau of WIPO Patent Application No. PCT/JP2017/032511, dated Nov. 28, 2017.
Office Action issued in Japanese an English translation thereof family member Patent Appl. No. 2016-189477, dated Mar. 10, 2020, along with an English translation thereof.
Search Report issued in European Patent Office (EPO) family member Patent Application No. 17855671.8, dated Mar. 11, 2020.
ZTE (email discussion convener), Summary of email discussion on Slicing WT1 (i.e.NS_WT_#1) assuming one UE—one slice and fully seperated slices (i.e. a basicmodel)[online], 3GPP TSG-SA WG2#116 S2-163508, Internet URL: http://www.3gpp.org/ftp/tsg_sa/WG2_Arch/TSGS2_116_Vienna/Docs/S2-163508.zip, Jul. 15, 2016.
ETRI, KDDI, KPN, Nokia, Oracle, Samsung, ZTE, Network Slicing Solution#2 Update[online], 3GPP TSG-SA WG2#116b is S2-165258, Internet URL: http://www.3gpp.org/ftp/tsg_sa/WG2_Arch/TSGS2_116BIS_Sanya/Docs/S2-165258.zip, Sep. 2, 2016.
"3rd Generation Partnership Project; Technical Specification Group Services and System Aspects; General Packet Radio Service (GPRS) enhancements for Evolved Universal Terrestrial Radio Access Network (E-UTRAN) access (Release 14)", 3GPP Standard; 3GPP TS 23.401, 3rd Generation Partnership Project (3GPP), Mobile Competence Centre; 650, Route Des Lucioles; F-06921 Sophia-Antipolis Cedex; France, vol. SA WG2, No. V14.1.0, Sep. 26, 2016, pp. 1-379, XP051172575.

\* cited by examiner

COMMUNICATION SYSTEM THAT CHANGES NETWORK SLICE, COMMUNICATION DEVICE THAT CHANGES NETWORK SLICE, AND PROGRAM THAT CHANGES NETWORK SLICE

TECHNICAL FIELD

Embodiments of the present invention relate to a communication system, a communication device, and a program.

Priority is claimed on Japanese Patent Application. No. 2016-189477, filed Sep. 28, 2016, the content of which is incorporated herein by reference.

BACKGROUND ART

Research and development has been conducted on 5G which is a next-generation mobile communication system following Long Term Evolution (LTE) and LTE-Advanced. In a core network (CN) which performs mobility management of user equipments (UEs) a mobile core of 5G, it is assumed that network slices are provided to UEs (for example, see Non-Patent Documents 1 and 2).

CITATION LIST

Non-Patent Literature
[Non-Patent Document 1]
  3GPP TR23.799, "3rd Generation Partnership Project; Technical Specification Group Services and System Aspects; Study on Architecture for Next Generation System (Release 14)"
[Non-Patent Document 2]
  NGMN Alliance: "Description of Network Slicing Concept," Version 1.0, Jan. 13, 2016

SUMMARY OF INVENTION

Problem to be Solved by the Invention

However, in a state in which a UE is connected to a network slice, if the connected network slice is changed to another network slice, problems occur such as the consumption of wireless resources due to an increase of signaling messages and the change of the IP address. Typically, the UE performs a detach operation and an attach operation again to connect to another network slice. Because signaling messages are transmitted and received between the UE and a radio access network (RAN), wireless resources are consumed. If many UEs switch network slices at the same time, congestion may occur in the RAN.

When the network slice to which the UE is connected is changed, the IP address of the UE is also changed. When the IP address is changed, communication of the UE is disconnected. Further, in a service requiring IP address registration processing such as an IP multimedia subsystem (IMS) service, when the IP address of the UE is changed, registration processing needs to be performed again, in addition to the disconnection of communication.

It is an object of the present invention to switch the network slice to which the UIQ' is connected while limiting the consumption of wireless resources and without changing the IP address and disconnection of the communication.

Means for Solving the Problem (1) An aspect of the present invention is a communication system including a slice selector configured to select a second network slice, to which a first network slice to which a terminal device is connected is to be switched, from a multiple network slices respectively including a multiple network functions, a creator configured to create setting information used in communication between the terminal device and the first network slice, a notification unit configured to notify the second network slice of the setting information created by the creator, and a session management (SM) function instance included in the second network slice, the SM function instance being configured to determine a route on which traffic is to be transferred, using the setting information notified of by the notification unit.

(2) An aspect of the present invention is the communication system according to the above (1), wherein the setting information is information indicating an IP address that has been allocated to the terminal device by the first network slice and a radio access network (RAN) to which the terminal device is connected.

(3) An aspect of the present invention is the communication system according to the above (1) or (2), further comprising a user plane (U-plane) function instance included in the second network slice, the U-plane function instance being configured to set the route determined by the SM function instance.

(4) An aspect of the present invention is the communication system according to the above (1) or (2), further comprising a multiple user plane (U-plane) function instances included in the second network slice, the U-plane function instances being configured to set the route determined by the SM function instance, and a U-plane selector included in the second network slice, the U-plane selector being configured to select a U-plane function instance for setting the route determined by the SM function instance from the multiple U-plane function instances.

(5) An aspect of the present invention is the communication system according to the above (3) or (4), wherein the SM function instance is configured to notify the U-plane function instance for setting the route determined by the SM function instance of information indicating the RAN to which the terminal device is connected.

(6) An aspect of the present invention is the communication system according to any one of the above (3) to (5), further comprising a policy function instance configured to manage quality of service (QoS) of a user, wherein the U-plane function instance is configured to transmit information inquiring as to whether it is possible to accommodate the terminal device to the policy function instance, and the policy function instance is configured to determine whether or not it is possible to accommodate the terminal device and to notify, upon determining that it is possible to accommodate the terminal device, a traffic steering function (TSF) of information indicating that the first network slice to which the terminal device is connected is switched to the second network slice.

(7) An aspect of the present invention is the communication system according to any one of the above (1) to (6), wherein the SM function instance is configured to determine Whether or not it is possible to accommodate the terminal device when notified of the setting information by the notification unit and to notify the slice selector that it is not possible to accommodate the terminal device upon determining that it is not possible to accommodate the terminal device, and the slice selector is configured to reselect the second network slice when notified that it is not possible to accommodate the terminal device by the SM function instance.

(8) An aspect of the present invention is a communication device including a slice selector configured to select a second network slice, to which a first network slice to which a terminal device is connected is to be switched, from a multiple network slices respectively including a multiple network functions, a creator configured to create setting information used in communication between the terminal device and the first network slice, and a notification unit configured to notify the second network slice of the setting information created by the creator.

(9) An aspect of the present invention a communication device including a receiver configured to receive setting information used in communication with a first network slice, and an SM function instance included in a second network slice, the SM function instance being configured to determine a route on which traffic is to be transferred, using the setting information received by the receiver.

(10) An aspect of the present invention is a program causing a computer for a communication device to execute processing for selecting a second network slice, to Which a first network slice to which a terminal device is connected is to be switched, from a multiple network slices respectively including a multiple network functions, creating setting information used in communication between the terminal device and the first network slice, and notifying the second network slice of the created setting information.

(11) An aspect of the present invention is a program causing a computer for a communication device to execute processing for receiving setting information used in communication with a first network slice, and determining a route on which traffic is to be transferred, using the received setting information, in a second network slice.

Advantageous Effects of Invention

According to embodiments of the present invention, it is possible to switch the network slice to which the UE is connected while limiting the consumption of wireless resources and without changing the IP address and disconnection of the communication.

DESCRIPTION OF EMBODIMENTS

Embodiments

Figure 1:
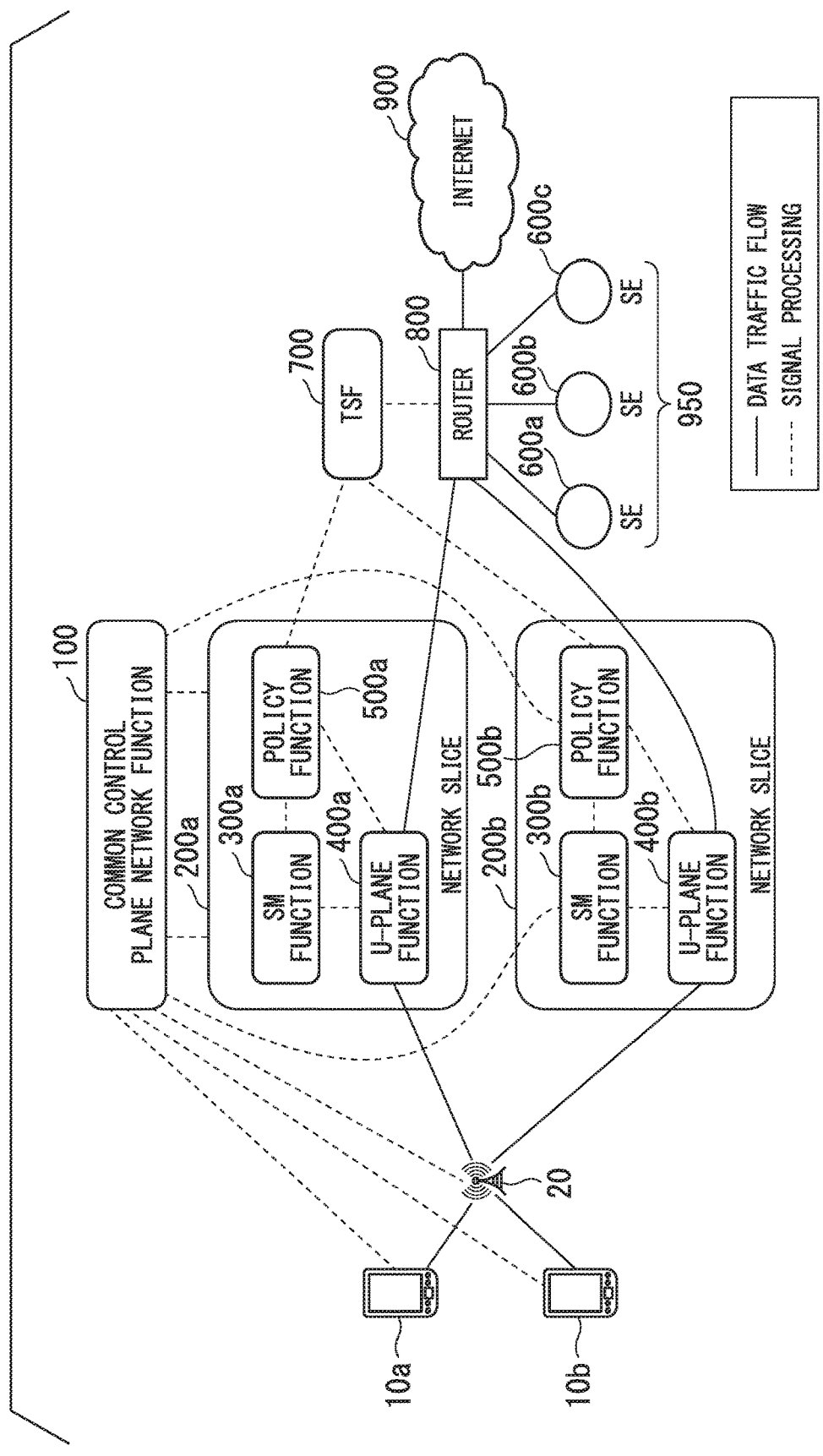
FIG. 1 is a schematic diagram showing an example of a communication system.

FIG. 1 is a diagram showing an example of an environment of a network to which a communication system according to an embodiment is applied.

The network includes a common control plane network function (CCNF) 100, a network slice 200a, a network slice 200b, a service enabler (SE) 600a, an SE 600b, an SE 600c, a traffic steering function (TSF) 700, a router 800, a UE 10a, a UE 10b, and a base station 20.

The network slices 200a and 200b are a multiple parts into which the network is virtually divided (sliced). The present embodiment will be described with reference to the case in which the network slice 200a and the network slice 200b are formed by virtually dividing the network into two parts.

The network slice 200a includes a session manager function (SM function) 300a, a U-plane function 400a, and a policy function 500a. The network slice 200b includes an SM function 300b, a U-plane function 400b, and a policy function 500b. Here, the CCNF 100, the network slice 200a, and the network slice 200b are included in a core network such as a next generation core. A network present between the Internet 900 and the core network is called a rear network 950. The rear network 950 includes the SE 600a, the SE 600b, the SE 600c, and the TSF 700.

Hereinafter, when the network slice 200a and the network slice 200b are not distinguished, they will be referred to as network slices 200. When the SM function 300a and the SM function 300b are not distinguished, they will be referred to as SM functions 300. When the U-plane function 400a and the U-plane function 400b are not distinguished, they will be referred to as U-plane functions 400. When the policy function 500a and the policy function 500b are not distinguished, they will be referred to as policy functions 500. When the SE 600a, the SE 600b, and the SE 600c are not distinguished, they will be referred to as SEs 600. When the UE 10a and the UE 10b are not distinguished, they will be referred to as UEs 10. The same applies to constituent elements included in the network slices 200.

The CCNF 100 is a control plane function commonly used among the network slices 200 and performs signal processing as a control plane node. The control plane function commonly used among the network slices 200 includes an authentication function, a subscriber database, a slice selection function, and the like. The CCNF 100 selects a network slice 200 to which the UE 10 is to be connected. Specifically, upon receiving an attach request transmitted by the UE 10 via a RAN, the CCNF 100 selects a network slice 200 to which the UE 10 is to be connected on the basis of information of the subscriber database. Upon receiving an allocation completion notification from the network slice 200 as the connection between the UE 10 and the network slice 200 is completed, the CCNF 100 holds an IP address that has been allocated to the UE 10 by the network slice 200 and information indicating the RAN to which the UE 10 is connected.

Further, when changing the network slice 200 to which the UE 10 is connected, the CCNF 100 selects another network slice 200 to which it is to be changed. The CCNF 100 changes the connected network slice 200, for example, when performing version upgrade of software included in the network slice 200 to which the UE 10 is connected or an exchange task due to a failure of hardware included in the network slice 200. The CCNF 100 also changes the connected network slice 200 when the user has changed a contract. Upon selecting another network slice 200, the CCNF 100 selects an SM function 300 to be connected to the UE 10 from one or more SM functions 300 included in the other network slice 200. Upon selecting the SM function 300, the CCNF 100 notifies the SM function 300 of the held IP address allocated to the UE 10 and the held information indicating the RAN to which the UE 10 is connected. In the other network slice 200, processes of transferring packets transmitted by the UE 10 and packets addressed to the UE 10 are performed using the IP address notified of by the CCNF 100. Also, in the other network slice 200, processes of transferring packets transmitted by the UE 10 and packets addressed to the UE 10 are performed using the information indicating the RAN notified of by the CCNF 100. That is, even if the network slice 200 is changed, the IP address of the UE 10 and the RAN to which the UE 10 connects are not changed.

The network slice 200 includes specific network functions and guarantees the communication quality of the UE 10 to a certain level. The network slice 200 includes an SM function 300, a U-plane function 400, and a policy function 500.

When newly connecting a UE 10 to the network slice 200, the SM function 300 allocates an IP address to the UE 10. Further, the SM function 300 selects a U-plane function 400. Upon selecting the U-plane function 400, the SM function 300 notifies the U-plane function 400 of information indicating a communication route of the UE 10.

Further, the SM function 300, which the CCNF 100 has selected when changing the network slice 200 to which the UE 10 is connected, determines whether or not it is possible to accommodate the UE 10. The SM function 300 determines that it is possible to accommodate the UE 10 when the UE 10 is included in pre-registered UEs 10 and determines that it is not possible to accommodate the UE 10 when the UE 10 is not included in the pre-registered UEs 10. When it is possible to accommodate the UE 10, the SM function 300 acquires the IP address allocated to the UE 10 and the information indicating the RAN to Which the UE 10 is connected, Which have been notified of by the CCNF 100. The SM function 300 selects a U-plane function 400.

The U-plane function 400 selected by the SM function 300 determines whether or not it is possible to accommodate the UE 10. The U-plane function 400 determines that it is possible to accommodate the UE 10 when the UE 10 is included in pre-registered UEs 10 and determines that it is not possible to accommodate the UE 10 when the UE 10 is not included in the pre-registered UEs 10. When it is possible to accommodate the UE 10, the U-plane function 400 acquires the information indicating the RAN to which the UE 10 is connected from the SM function 300. When it is possible to accommodate the UE 10, the U-plane function 400 inquires the policy function 500 about the quality of service (QoS) of the UE 10. The policy function 500 determines that it is possible to accommodate the UE 10 when the UE 10 is included in pre-registered UEs 10 and determines that it is not possible to accommodate the UE 10 When the UE 10 is not included in the pre-registered UEs 10. Upon determining that it is possible to accommodate the UE 10, the policy function 500 notifies the U-plane function 400 of the QoS of the UE. The U-plane function 400 transfers traffic from the UE 10 to the router 800 according to the QoS acquired from the policy function 500, thereby transferring the traffic to the rear network 950. In addition, the U-plane function 400 transfers traffic from the Internet 900 or the rear network 950 to the UE 10 according to the QoS acquired from the policy function 500.

The policy function 500 manages the setting of QoS for each user of the UE 10. The policy function 500 creates a list in which the IP address of the UE 10, whose QoS the U-plane function 400 has inquired about, and an SE 600 which transfers traffic transmitted by the UE 10 are associated with each other. The policy function 500 transmits the list to the TSF 700.

The SE 600 processes traffic transmitted by the UE 10 and traffic to the UE 10 in the rear network 950.

Upon acquiring the list in which the IP address of the UE 10 and the SE 600 which transfers traffic transmitted by the UE 10 are associated with each other from the policy function 500, the TSF 700 transmits the list to the router 800.

Upon acquiring the list in which the IP address of the UE 10 transmitted by the TSF 700 and the SE 600 which transfers the traffic transmitted by the UE 10 are associated with each other, the router 800 sets the list. The router 800 transfers traffic from the Internet 900 and transfers traffic from the core network on the basis of a command from the TSF 700.

In the communication system according to the embodiment, the network slice 200a and the network slice 200b provide different services. Specifically, the network slice 200a provides a broadband service and the network slice 200b provides the Internet of Things (IoT). Therefore, different network functions are set in the network slice 200a and the network slice 200b.

Network functions such as the CCNF 100, the SM function 300, the U-plane function 400, and the policy function 500 included in the communication system can be realized by software. Further, software can logically be regarded as an individual server or computer.

Hereinafter, the description will continue with the CCNF 100, the SM function 300, the U-plane function 400, and the policy function 500 regarded as information processing devices such as servers.

Figure 2:
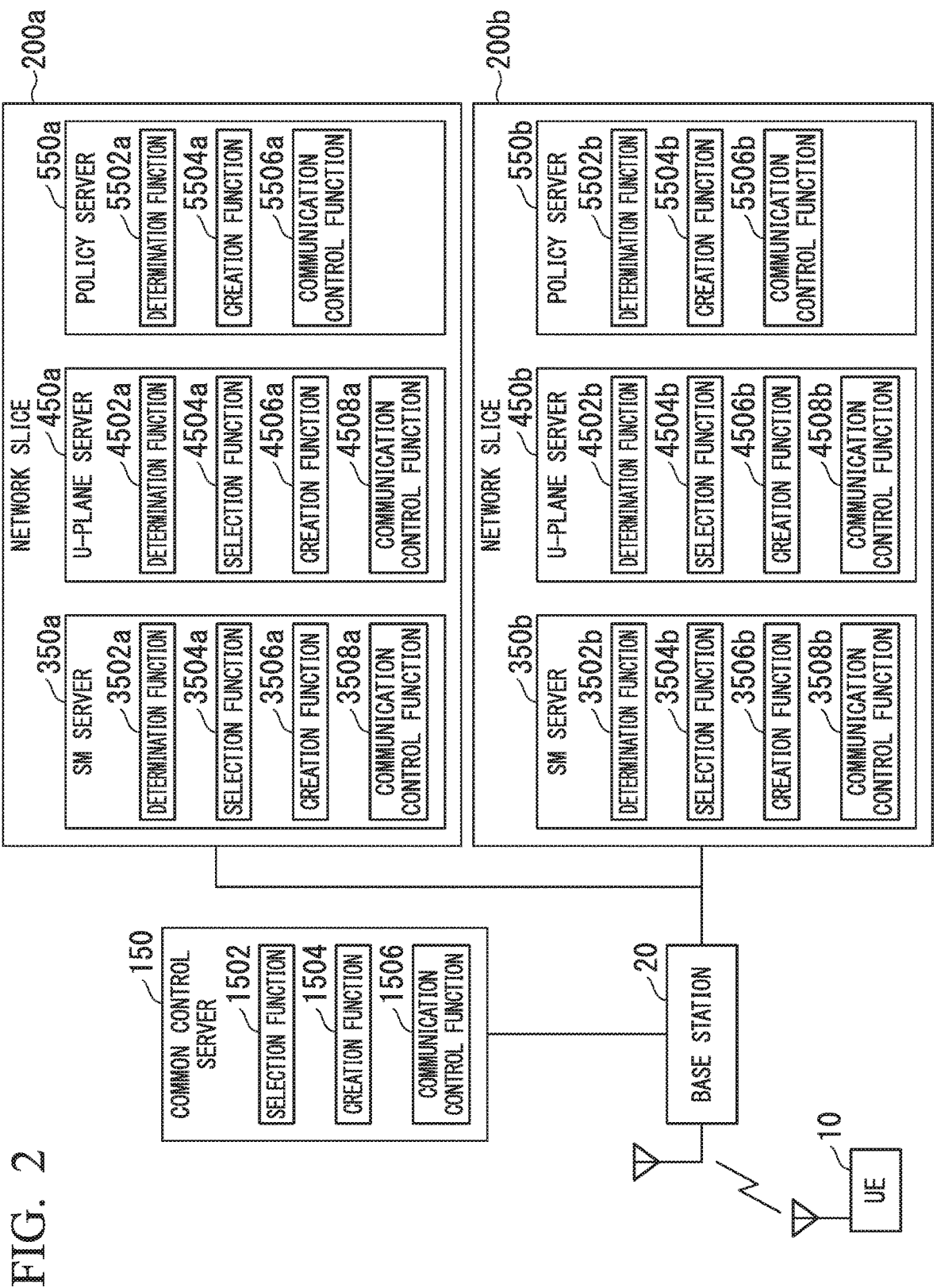
FIG. 2 is a schematic diagram showing an example of a communication system according to an embodiment.

FIG. 2 shows a communication system constructed with software that realizes the CCNF 100, the SM function 300, the U-plane function 400, the policy function 500, or the like included in the communication system, regarded as information processing devices.

The communication system includes a common control server 150, SM servers 350a and 350b, U-plane servers 450a and 450b, and policy servers 550a and 550b. When the SM server 350a and the SM server 350b are not distinguished, they will be referred to as SM servers 350. When the U-plane server 450a and the U-plane server 450b are not distinguished, they will be referred to as U-plane servers 450. When the policy server 550a and the policy server 550b are not distinguished, they will be referred to as policy servers 550. The same applies to constituent elements included in the SM servers 350. The same applies to constituent elements included in the U-plane servers 450 and constituent elements included in the policy servers 550.

The common control server 150 has the functionality of the CCNF 100, the SM server 350 has the functionality of the SM function 300, the U-plane server 450 has the functionality of the U-plane function 400, and the policy server 550 has the functionality of the policy function 500. A base station 20 and a UE 10 are also shown in FIG. 2.

The common control server 150 includes a selection function 1502, a creation function 1504, and a communication control function 1506. A network slice 200 includes an SM server 350, a U-plane server 450, and a policy server 550. The SM server 350 includes a determination function 3502, a selection function 3504, a creation function 3506, and a communication control function 3508. The U-plane server 450 includes a determination function 4502, a selection function 4504, a creation function 4506, and a communication control function 4508. The policy server 550 includes a determination function 5502, a creation function 5504, and a communication control function 5506.

<Common Control Server>

Figure 3:
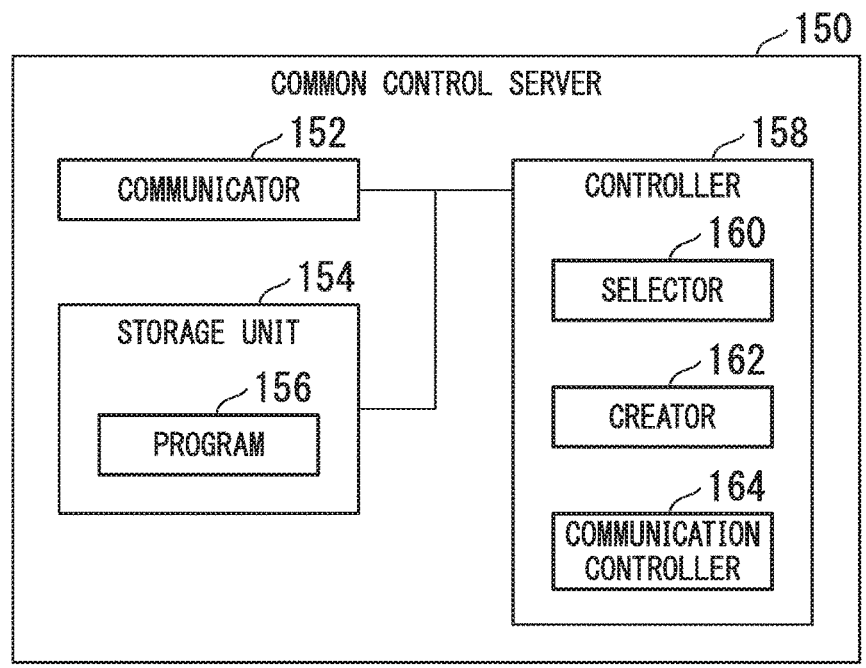
FIG. 3 is a diagram showing an example of a common control server according to the embodiment.

FIG. 3 is a block diagram showing a schematic configuration of the common control server 150 according to the present embodiment. The common control server 150 includes a communicator 152, a storage unit 154, and a controller 158. The communicator 152 is constituted by a communication module and communicates with an external device wirelessly or by wire. In the present embodiment, the communicator 152 transmits and receives signals to and from the RANs, the SM servers 350, and the base station 20 wirelessly or by wire. The storage unit 154 stores various data such as information in which an IP address allocated to a UE 10 and information indicating a RAN to which the UE 10 is connected are associated with each other, and a program 156 that is executed by the controller 158.

The controller 158 is constituted by an arithmetic processing unit such as a CPU and functions as a selector 160, a creator 162, and a communication controller 164 by executing the program 156 stored in the storage unit 154. The selector 160, the creator 162, and the communication controller 164 correspond to the selection function 1502, the creation function 1504, and the communication control function 1506 in FIG. 2, respectively.

Upon acquiring an attach request transmitted by a UE 10 through the communicator 152, the selector 160 selects a network slice 200a to which the UE 10 is to be connected. Upon selecting the network slice 200a, the selector 160 selects an SM server 350a from one or more SM servers 350 included in the network slice 200a.

Upon selecting the SM server 350a, the selector 160 creates a UE accommodation request which is a request to inquire whether or not it is possible to accommodate the UE 10 and which is addressed to the SM server 350a and outputs the UE accommodation request to the communication controller 164. The selector 160 acquires a UE accommodation request response, which is a response to the UE accommodation request, from the SM server 350a. When accommodation rejection information indicating that it is not possible to accommodate the UE 10 is included in the UE accommodation request response, the selector 160 reselects an SM server other than the SM server 350a from one or more SM servers 350 included in the network slice 200a. The selector 160 may perform predetermined error processing when no SM server 350 can be reselected. On the other hand, when accommodation permission information indicating that both the SM server 350 and the U-plane server 450 can accommodate the UE 10 is included in the UE accommodation request response, the selector 160 outputs the accommodation permission information to the creator 162 and the communication controller 164.

When the UE 10 connected to the network slice 200a switches the network slice 200a to which the UE 10 is connected, the selector 160 selects a network slice 200b which is the destination of switching. Upon selecting the network slice 200b, the selector 160 selects an SM server 350b from one or more SM servers 350 included in the network slice 200b. Upon selecting the SM server 350b, the selector 160 creates a UE. accommodation request which is a request to inquire whether or not it is possible to accommodate the UE 10 and which is addressed to the SM server 350b and outputs the UE accommodation request to the communication controller 164. Further, the selector 160 outputs a first setting information creation request, which is a request to create setting information used among the UE 10 and the network slice 200a, to the creator 162a. The selector 160 acquires a UE accommodation request response, which is a response to the UE accommodation request, from the SM server 350b. When accommodation rejection information indicating that it is not possible to accommodate the UE 10 is included in the UE accommodation request response, the selector 160 reselects an SM server other than the SM server 350b from one or more SM servers 350 included in the network slice 200b to which the network slice 200a, to which the UE 10 is connected, is to be switched. When no SM server 350 can be reselected, the selector 160 may perform predetermined error processing. On the other hand, when accommodation permission information indicating that the SM server 350 and the U-plane server 450 can accommodate the UE 10 is included in the HE accommodation request response, the selector 160 outputs the accommodation permission information to the creator 162 and the communication controller 164.

Upon acquiring the accommodation permission information output by the selector 160, the creator 162 creates an attachment completion notification that includes information indicating the U-plane server 450a that performs processing on the UE 10. Then, the creator 162 outputs the created attachment completion notification to the communication controller 164. Further, upon acquiring the first setting information creation request output by the selector 160, the creator 162 creates first setting information including the IP address that has been allocated to the UE 10 by the network slice 200a to which the UE 10 is connected and information indicating the RAN to which the UE 10 is connected. Then, the creator 162 outputs the created first setting information to the communication controller 164. Further, in the case in which the creator 162 has acquired the accommodation permission information output by the selector 160 and the UE 10 is connected to the network slice 200, the creator 162 creates a slice switching notification including information indicating a new U-plane server 450b that performs processing on the UE 10. Then, the creator 162 outputs the created slice switching notification to the communication controller 164.

The communication controller 164 functions as a control plane commonly used by the network slice 200a and the network slice 200b. Upon acquiring the UE accommodation request output by the selector 160, the communication controller 164 causes the communicator 152 to transmit the UE accommodation request to the SM server 350b. Upon acquiring the first setting information output by the creator 162, the communication controller 164 causes the communicator 152 to transmit the first setting information to the SM server 350b. Upon acquiring the accommodation permission information from the selector 160, the communication controller 164 allocates the SM server 350b and the U-plane server 450b to the UE 10. Upon acquiring the attachment completion notification from the creator 162, the communication controller 164 transmits the attachment completion notification to the RAN through the communicator 152. Also, upon acquiring the slice switching notification from the creator 162, the communication controller 164 causes the communicator 152 to transmit the slice switching notification to the RAN.

<SM Server>

Figure 4:
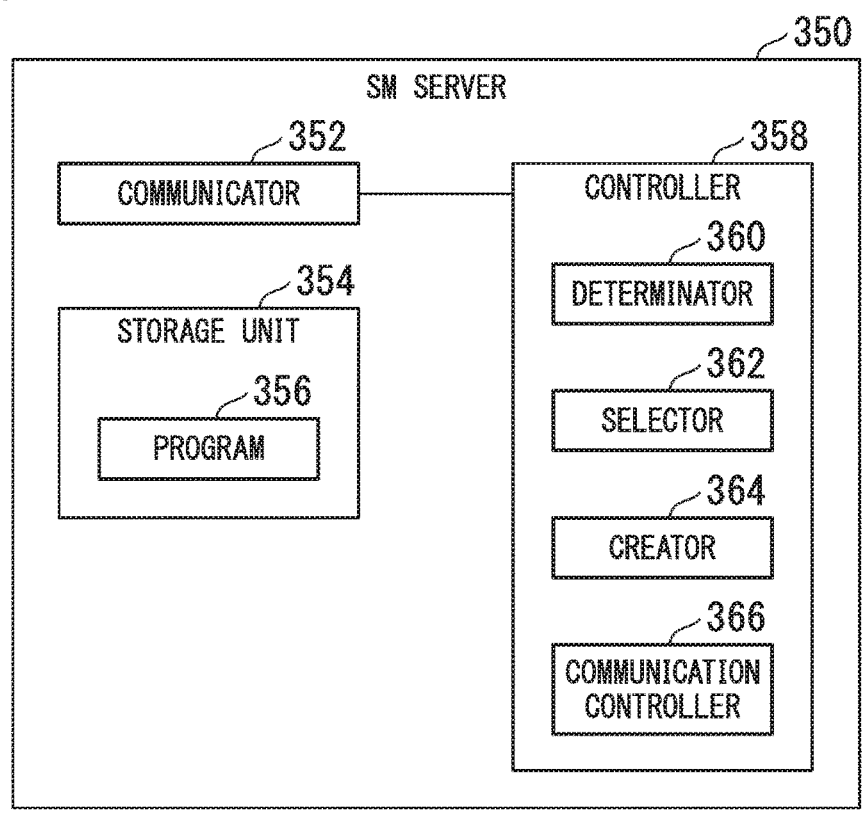
FIG. 4 is a diagram showing an example of a session manager server according to the embodiment.

FIG. 4 is a block diagram showing a schematic configuration of the SM server 350 according to the present embodiment. The SM server 350 includes a communicator 352, a storage unit 354, and a controller 358. The communicator 152 of the common control server 150 described above with reference to FIG. 3 can be applied to the communicator 352. However, the communicator 352 transmits and receives signals to and from the common control server 150 and the base station 20. The storage unit 154 of the common control server 150 described above with reference to FIG. 3 can be applied to the storage unit 354. However, the storage unit 354 stores various data such as information in which the IP address allocated to the UE 10 and the information indicating the RAN to which the UE 10 is connected are associated with each other, and a program 356 that is executed by the controller 358.

The controller 358 is constituted by an arithmetic processing unit such as a CPU and functions as a determinator 360, a selector 362, a creator 364, and a communication controller 366 by executing the program 356 stored in the storage unit 354. The determinator 360, the selector 362, the creator 364, and the communication controller 366 correspond to the determination function 3502, the selection function 3504, the creation function 3506, and the communication control function 3508 in FIG. 2, respectively.

Upon acquiring the UE accommodation request transmitted by the common control server 150 through the communicator 352, the determinator 360 determines Whether or not it is possible to accommodate the UE 10. The determinator 360 determines that it is possible to accommodate the UE 10 When the UE 10 is included in pre-registered UEs 10 and determines that it is not possible to accommodate the UE 10 when the UE 10 is not included in the pre-registered UEs 10. Upon determining that it is possible to accommodate the UE 10, the determinator 360 outputs UE accommodation information indicating that it is possible to accommodate the UE 10 to the selector 362. Upon determining that it is not possible to accommodate the UE 10, the determinator 360 creates a UE accommodation request response including accommodation rejection information and outputs the created UE accommodation request response to the communication controller 366.

Upon acquiring the UE accommodation information output by the determinator 360, the selector 362 selects a U-plane server 450b from one or a more Uniplane servers 450 included in the network slice 200b. The selector 362 creates a UE accommodation request which is a request to inquire whether or not it is possible to accommodate the UE 10 and which is addressed to the U-plane server 450b and outputs the UE accommodation request to the communication controller 366. Then, the selector 362 outputs a second setting information creation request, which is a request to create second setting information used in communication between the UE 10 and the network slice 200a, to the creator 364.

The selector 362 acquires a UE accommodation request response, which is a response to the UE accommodation request, from the U-plane server 450b. When information indicating that selection of the U-plane server 450b has been completed is included in the UE accommodation request response, the selector 362 outputs a U-plane server selection completion notification, which is information indicating that selection of the U-plane server 450b has been completed, to the creator 364 and the communication controller 366.

The creator 364 acquires the first setting information transmitted by the common control server 150 through the communicator 352. Upon acquiring the second setting information creation request output by the selector 362, the creator 364 acquires information indicating the RAN to which the UE 10 is connected from the first setting information and creates second setting information including the information indicating the RAN to which the UE 10 is connected. Then, the creator 364 outputs the created second setting information to the communication controller 366. Upon acquiring the U-plane server selection completion notification from the selector 362, the creator 364 creates a UE accommodation request response including accommodation permission information indicating that the SM server 350 and the U-plane server 450 can accommodate the UE 10. Then, the creator 364 outputs the created UE accommodation request response to the communication controller 366.

Upon acquiring the UE accommodation request response output from the determinator 360, the communication controller 366 transmits the UE accommodation request response to the common control server 150 through the communicator 352. Upon acquiring the UE accommodation request output by the selector 362, the communication controller 366 transmits the UE accommodation request to the Uniplane server 450 through the communicator 352. Upon acquiring the second setting information output by the creator 364, the communication controller 366 transmits the second setting information to the U-plane server 450 through the communicator 352. Upon acquiring the U-plane server selection completion notification from the selector 362, the communication controller 366 allocates the U-plane server 450b to the UE 10. Upon acquiring the UE accommodation request response output by the creator 364, the communication controller 366 transmits the UE accommodation request response to the common control server 150 through the communicator 352.

<U-Plane Server>

Figure 5:
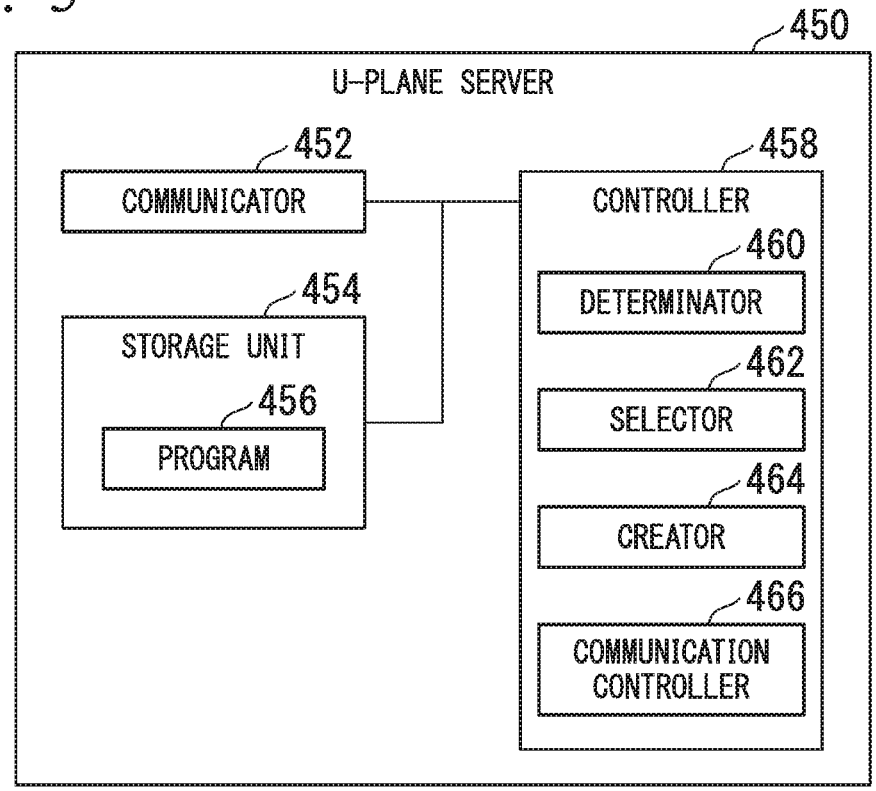
FIG. 5 is a diagram showing an example of a U-plane server according to the embodiment.

FIG. 5 is a block diagram showing a schematic configuration of the U-plane server 450 according to the present embodiment. The U-plane server 450 includes a communicator 452, a storage unit 454, and a controller 458. The communicator 152 of the common control server 150 described above with reference to FIG. 3 can be applied to the communicator 452. However, the communicator 452 transmits and receives signals to and from the SM server 350, the base station 20, and the router 800. The storage unit 154 of the common control server 150 described above with reference to FIG. 3 can be applied to the storage unit 454. However, the storage unit 454 stores a program 456 that is executed by the controller 458.

The controller 458 is constituted by an arithmetic processing unit such as a CPU and functions as a determinator 460, a selector 462, a creator 464, and a communication controller 466 by executing the program 456 stored in the storage unit 454. The determinator 460, the selector 462, the creator 464, and the communication controller 466 correspond to the determination function 4502, the selection function 4504, the creation function 4506, and the communication control function 4508 in FIG. 2, respectively.

Upon acquiring the UE accommodation request transmitted by the SM server 350 via the communicator 452, the determinator 460 determines whether or not it is possible to accommodate the UE 10. The determinator 460 determines that it is possible to accommodate the UE 10 when the UE 10 is included in pre-registered UEs 10 and determines that it is not possible to accommodate the UE 10 when the UE 10 is not included in the pre-registered UEs 10. Upon determining that it is possible to accommodate the UE 10, the determinator 460 outputs UE accommodation information indicating that it is possible to accommodate the UE 10 to the selector 462. Upon determining that it is not possible to accommodate the UE 10, the determinator 460 creates a UE accommodation request response including accommodation rejection information and outputs the created UE accommodation request response to the communication controller 466.

Upon acquiring the UE accommodation information output by the determinator 460, the selector 462 selects a policy server 550b from one or more policy servers 550 included in the network slice 200b. The selector 462 creates a UE accommodation request which is a request to inquire whether or not it is possible to accommodate the UE 10 and which is addressed to the policy server 550b and outputs the UE accommodation request to the communication controller 466.

The selector 462 acquires a UE accommodation request response, which is a response to the UE accommodation request, from the policy server 550b. When the UE accommodation request response includes accommodation rejection information indicating that it is not possible to accommodate the UE 10, the selector 462 outputs the UE accommodation request response to the communication controller 466. On the other hand, when the UE accommodation request response includes accommodation permission information indicating that the policy server 550b can accommodate the UE 10, the selector 462 outputs the accommodation permission information to the creator 464 and the communication controller 466.

Upon acquiring the accommodation permission information from the selector 462, the creator 464 creates a UE accommodation request response including a U-plane server selection completion notification indicating that selection of the U-plane server 450 has been completed. Then, the creator 464 outputs the created UE accommodation request response to the communication controller 466.

Upon acquiring the UE accommodation request response output by the determinator 460, the communication controller 466 transmits the UE accommodation request response to the SM server 350 through the communicator 452. Upon acquiring the UE accommodation request output by the selector 462, the communication controller 466 transmits the UE accommodation request to the policy server 550 through the communicator 452. Further, upon acquiring the accommodation permission information from the selector 462, the communication controller 466 associates the QoS set in the UE 10 with the UE 10. Upon acquiring the UE accommodation request response output by the creator 464, the communication controller 466 transmits the UE accommodation request response to the SM server 350 through the communicator 452.

<Policy Server>

Figure 6:
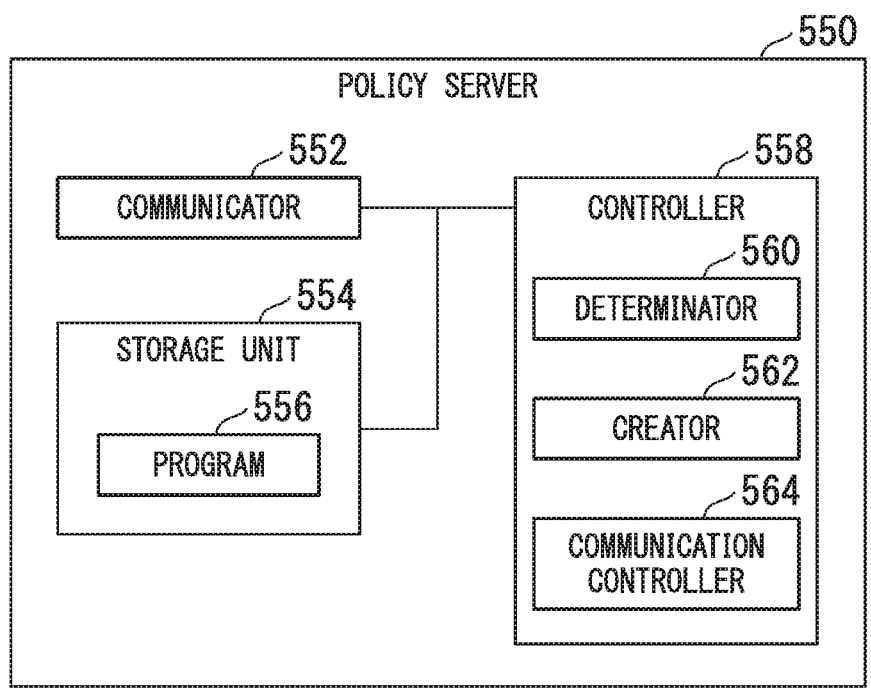
FIG. 6 is a diagram showing an example of a policy server according to the embodiment.

FIG. 6 is a block diagram showing a schematic configuration of the policy server 550 according to the present embodiment.

The policy server 550 includes a communicator 552, a storage unit 554, and a controller 558. The communicator 152 of the common control server 150 described above with reference to FIG. 3 can be applied to the communicator 552. However, the communicator 552 transmits and receives signals with the U-plane server 450 and the TSF 700. The storage unit 154 of the common control server 150 described above with reference to FIG. 3 can be applied to the storage unit 554. However, the storage unit 554 stores a program 556 that is executed by the controller 558.

The controller 558 is constituted by an arithmetic processing unit such as a CPU and functions as a determinator 560, a creator 562, and a communication controller 564 by executing the program 556 stored in the storage unit 554. The determinator 560, the creator 562, and the communication controller 564 correspond to the determination function 5502, the creation function 5504, and the communication control function 5506 in FIG. 2, respectively.

Upon acquiring the UE accommodation request transmitted by the U-plane server 450 via the communicator 552, the determinator 560 determines whether or not it is possible to accommodate the UE 10. The determinator 560 determines that it is possible to accommodate the UE 10 when the UE 10 is included in pre-registered UEs 10 and determines that it is not possible to accommodate the LIE 10 when the UE 10 is not included in the pre-registered UEs 10. Upon determining that it is possible to accommodate the UE 10, the determinator 560 outputs UE accommodation information indicating that it is possible to accommodate the UE 10 to the creator 562. Upon determining that it is not possible to accommodate the UE 10, the determinator 560 creates a UE accommodation request response including accommodation rejection information and outputs the created UE accommodation request response to the communication controller 564.

Upon acquiring the UE accommodation information from the determinator 560, the creator 562 creates a change notification including information indicating that the network slice 200 to which the UE 10 is connected is to be changed from the network slice 200a to the network slice 200b. Then, the creator 562 outputs the created change notification to the communication controller 564. Further, upon acquiring the UE accommodation information from the determinator 560, the creator 562 creates a UE accommodation request response including the UE accommodation information. Then, the creator 562 outputs the created UE accommodation request response to the communication controller 564.

Upon acquiring the change notification output by the creator 562, the communication controller 564 causes the communicator 552 to transmit the change notification to the TSF 700. Upon acquiring the UE accommodation request response output by the creator 562, the communication controller 564 transmits the UE accommodation request response to the U-plane server 450 through the communicator 552.

<Operation of Communication System>

Figure 7:
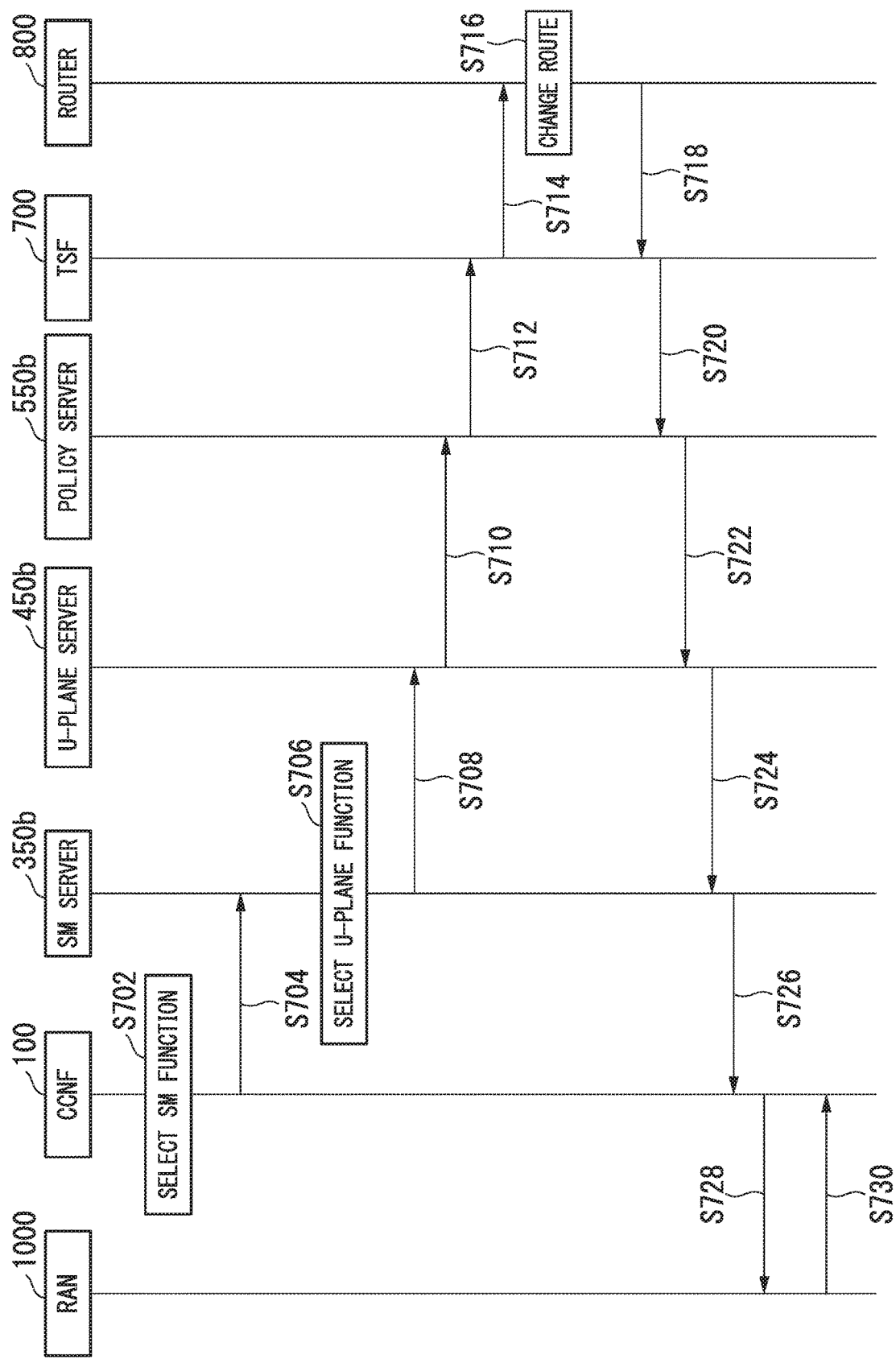
FIG. 7 is a sequence chart showing an example of the operation of the communication system according to the embodiment.

FIG. 7 is a sequence chart showing an example of the operation of the communication system according to the embodiment. The UE 10 is connected to the network slice 200a. Then, the network slice 200 to which the UE 10 is connected is switched from the network slice 200a to the network slice 200b. Here, the case in which it is determined that the SM server 350b, the U-plane server 450b, and the policy server 550b can accommodate the UE 10 will be described.

In step 5702, the selector 160 of the common control server 150 (the CCNF 100) selects the network slice 200b to which the network slice 200a is to be switched and selects an SM server 350b from SM servers 350 included in the network slice 200b. Upon selecting the SM server 350b, the selector 160 creates a UE accommodation request which is a request to inquire whether or not it is possible to accommodate the UE 10 and Which is addressed to the SM server 350b and outputs the UE accommodation request to the communication controller 164. The communication controller 164 causes the communicator 152 to transmit the UE accommodation request to the SM server 350b.

In step S704, the creator 162 of the common control server 150 creates first setting information including the IP address that has been allocated to the UE 10 by the network slice 200a and the information indicating the RAN to which the UE 10 is connected. The communication controller 164 causes the communicator 152 to transmit the first setting information to the SM server 350b.

In step S706, upon acquiring the UE accommodation request transmitted by the common control server 150, the determinator 360 of the SM server 350b determines that it is possible to accommodate the UE 10. Then, the selector 362 of the SM server 350b selects a U-plane server 450b. Upon selecting the U-plane server 450b, the selector 362 creates a UE accommodation request which is a request to inquire whether or not it is possible to accommodate the UE 10 and which is addressed to the U-plane server 450b and outputs the UE accommodation request to the communication controller 366. The communication controller 366 causes the communicator 352 to transmit the UE accommodation request to the U-plane server 450b.

In step S708, the creator 364 of the SM server 350b creates second setting information including information indicating the RAN to which the UE 10 is connected. The communication controller 366 transmits the second setting information to the U-plane server 450b through the communicator 352.

In step S710, upon acquiring the UE accommodation request transmitted by the SM serer 350b, the determinator 460 of the U-plane server 450b determines that it is possible to accommodate the UE 10. Then, the selector 462 of the U-plane server 450b selects a policy server 550b. Upon selecting the policy server 550b, the selector 462 creates a UE accommodation request which is a request to inquire whether or not it is possible to accommodate the UE 10 and which is addressed to the policy server 550b and outputs the UE accommodation request to the communication controller 466. The communication controller 466 causes the communicator 452 to transmit the UE accommodation request to the policy server 550b.

In step S712, upon acquiring the UE accommodation request transmitted by the U-plane server 450b, the determinator 560 of the policy server 550b determines that it is possible to accommodate the UE 10. Then, the creator 562 of the policy server 550b creates a change notification including information indicating that the network slice 200 to which the UE 10 is connected is to be changed from the network slice 200a to the network slice 200b. The communication controller 564 causes the communicator 552 to transmit the change notification to the TSF 700.

In step S714, upon acquiring the change notification from the policy server 550b, the TSF 700 transfers the change notification to the router 800, thereby making a route change request.

In step S716, upon acquiring the change notification from the TSF 700, the router 800 changes the network slice 200 to which the UE 10 is connected to the network slice 200b. As a result, traffic destined for the UE 10 is transferred to the network slice 200b. The router 800 updates a route table on the basis of the IP address of the destination or the transmission source. When updating the route table, the router 800 writes, for example, a host route such as "10.10.10.1/32" to the route table upon switching the network slice 200. After switching network slices 200 of many UEs 10, the router 800 may aggregate routes into "/24" or "/27" if they can be automatically aggregated.

In step S718, when change of the route of the UE 10 has been completed, the router 800 transmits a route change completion notification to the TSF 700.

In step S720, upon receiving the route change completion notification transmitted by the router 800, the TSF 700 creates a change processing completion notification including information indicating that processing for changing the network slice 200 to which the UE 10 is connected from the network slice 200a to the network slice 200b has been completed and transmits the change processing completion notification to the policy server 550b.

In step S722, upon acquiring the change processing completion notification transmitted by the TSF 700, the creator 562 of the policy server 550b creates a UE accommodation request response including accommodation permission information indicating that it is possible to accommodate the UE 10. The communication controller 564 transmits the UE accommodation request response (UE accommodation availability response) to the U-plane server 450b through the communicator 552.

In step S724, upon acquiring the UE accommodation request response transmitted by the policy server 550b, the creator 464 of the U-plane server 450b confirms that the accommodation permission information is included in the UE accommodation request response. Upon confirming that the accommodation permission information is included in the UE accommodation request response, the creator 464 creates a UE accommodation request response including a U-plane server selection completion notification. The communication controller 466 causes the communicator 452 to transmit the UE accommodation request response to the SM server 350b. That is, the U-plane server 450b transmits a U-plane function selection completion notification to the SM server 350b.

In step S726, upon acquiring the UE accommodation request response transmitted by the U-plane server 450b, the creator 364 of the SM server 350b confirms that the U-plane server selection completion notification is included in the UE accommodation request response. Upon confirming that the U-plane server selection completion notification is included in the UE accommodation request response, the creator 364 creates a UE accommodation request response including accommodation permission information indicating that the SM server 350b and the U-plane server 450b can accommodate the UE 10. The communication controller 366 transmits the UE accommodation request response to the common control server 150 through the communicator 352. That is, the SM server 350b transmits an SM function/U-plane function allocation completion notification to the common control server 150.

In step S728, upon acquiring the UE accommodation request response transmitted by the SM server 350b, the creator 162 of the common control server 150 confirms that the accommodation permission information is included in the UE accommodation request response. In the case in which the accommodation permission information is included in the UE accommodation request response and the UE 10 is connected to the network slice 200, the creator 162 creates a slice switching notification including information indicating a new U-plane server 450b that performs processing on the UE 10. The communication controller 164 transmits the UE accommodation request response to the RAN 1000 through the communicator 152.

In step S730, upon acquiring the slice switching notification transmitted by the common control server 150, the RAN 1000 creates a response message which is a response to the slice switching notification and transmits the response message to the common control server 150. The common control server 150 receives the response message transmitted by the RAN 1000.

Figure 8:
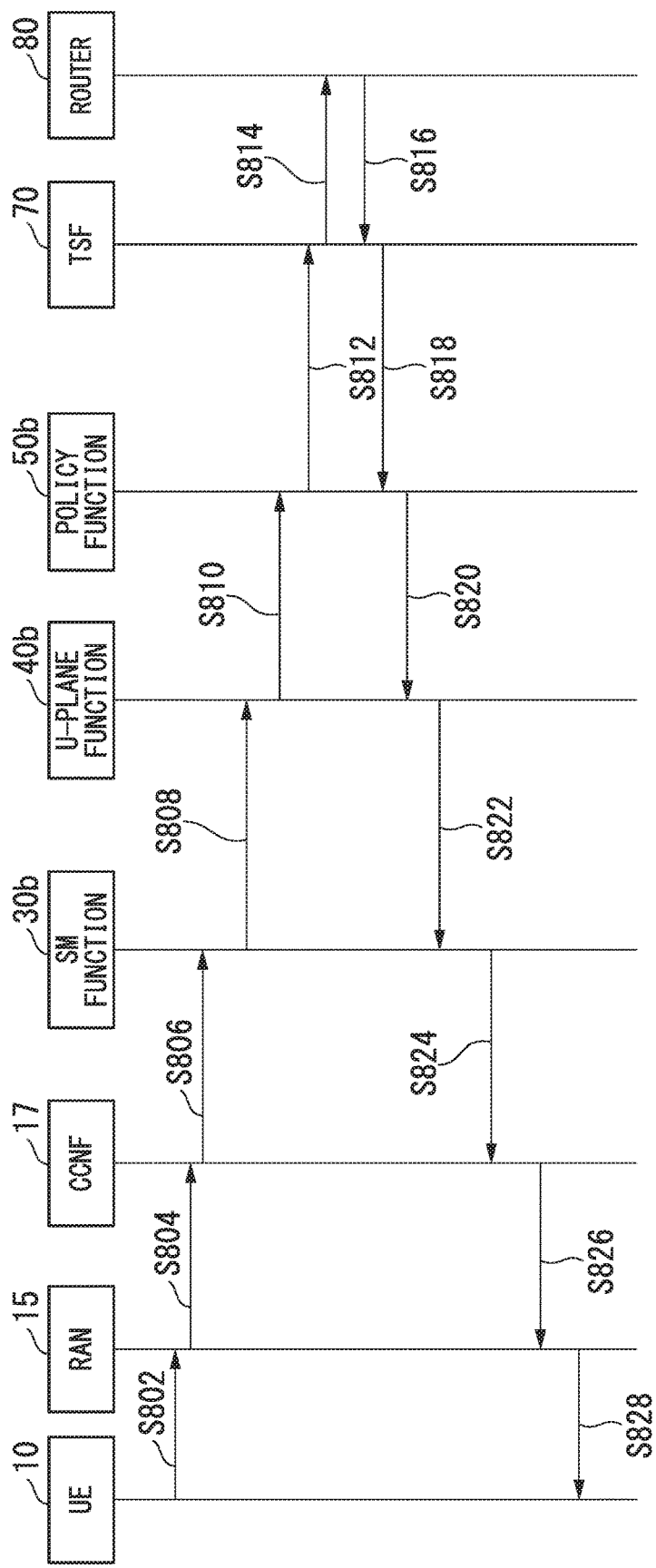
FIG. 8 is a sequence chart showing a (first) example of the operation of a communication system.

FIG. 8 shows an example of a call flow in which a network slice is selected when a UE 10 is connected to a network in a communication system to which 5G is applied.

In steps S802 to S804, a CCNF 17 acquires an attach request transmitted by a UE 10 via a RAN 15.

In step S806, upon acquiring the attach request transmitted by the UE 10, the CCNF 17 refers to information in a subscriber database to select a network slice. Then, the CCNF 17 selects an SM function 30b from SM functions 30 included in the selected network slice.

In step S808, the SM function 30b allocates an IP address to the UE 10. Further, the SM function 30b selects a U-plane function 40b from U-plane functions included in the selected network slice.

In step S810, the U-plane function 40b selects a policy function 50b from policy functions included in the selected network slice. Then, the U-plane function 40b confirms the QoS of the UE 10, to the policy function 50b.

In step S812, the policy function 50b notifies a TSF 70 of the IP address of the UE 10 and information indicating an SE in the rear network.

In step S814, upon acquiring the IP address of the UE 10 and the information indicating the SE in the rear network from the policy function 50b, the TSF 70 sets the IP address of the UE 10 and the information indicating the SE in the rear network. The TSF 70 transmits a route setting command to a router 80.

In step S816, upon acquiring the route setting command transmitted by the TSF 70, the router 80 performs route setting. Then, the router 80 transmits a route setting completion notification to the TSF 70.

In step S818, upon acquiring the route setting completion notification transmitted by the router 80, the TSF 70 transmits the route setting completion notification to the policy function 50b.

In step S820, upon acquiring the route setting completion notification transmitted by the TSF 70, the policy function 50b notifies the U-plane function 40b of the QoS information of the UE 10.

In step S822, upon acquiring the QoS information transmitted by the policy function 50b, the U-plane function 40b sets the QoS information. Upon setting the QoS information, the U-plane function 40b notifies the SM function 30b of information indicating that selection of the U-plane function 40b has been completed.

In step S824, upon acquiring the information indicating completion of the selection of the U-plane function 40b transmitted by the U-plane function 40b, the SM function 30b sets the U-plane function 40b. Upon setting the U-plane function 40b, the SM function 30b notifies the CCNF 17 of information indicating that allocation of the SM function 30b and the U-plane function 40b has been completed.

In step S826, upon acquiring the information indicating completion of the allocation of the SM function 30b and the U-plane function 40b transmitted by the SM function 30b, the CCNF 17 notifies the RAN 15 of the completion of attachment.

In step S828, upon acquiring the completion of attachment transmitted by the CCNF 17, the RAN 15 notifies the UE 10 of the completion of attachment.

Figure 9:
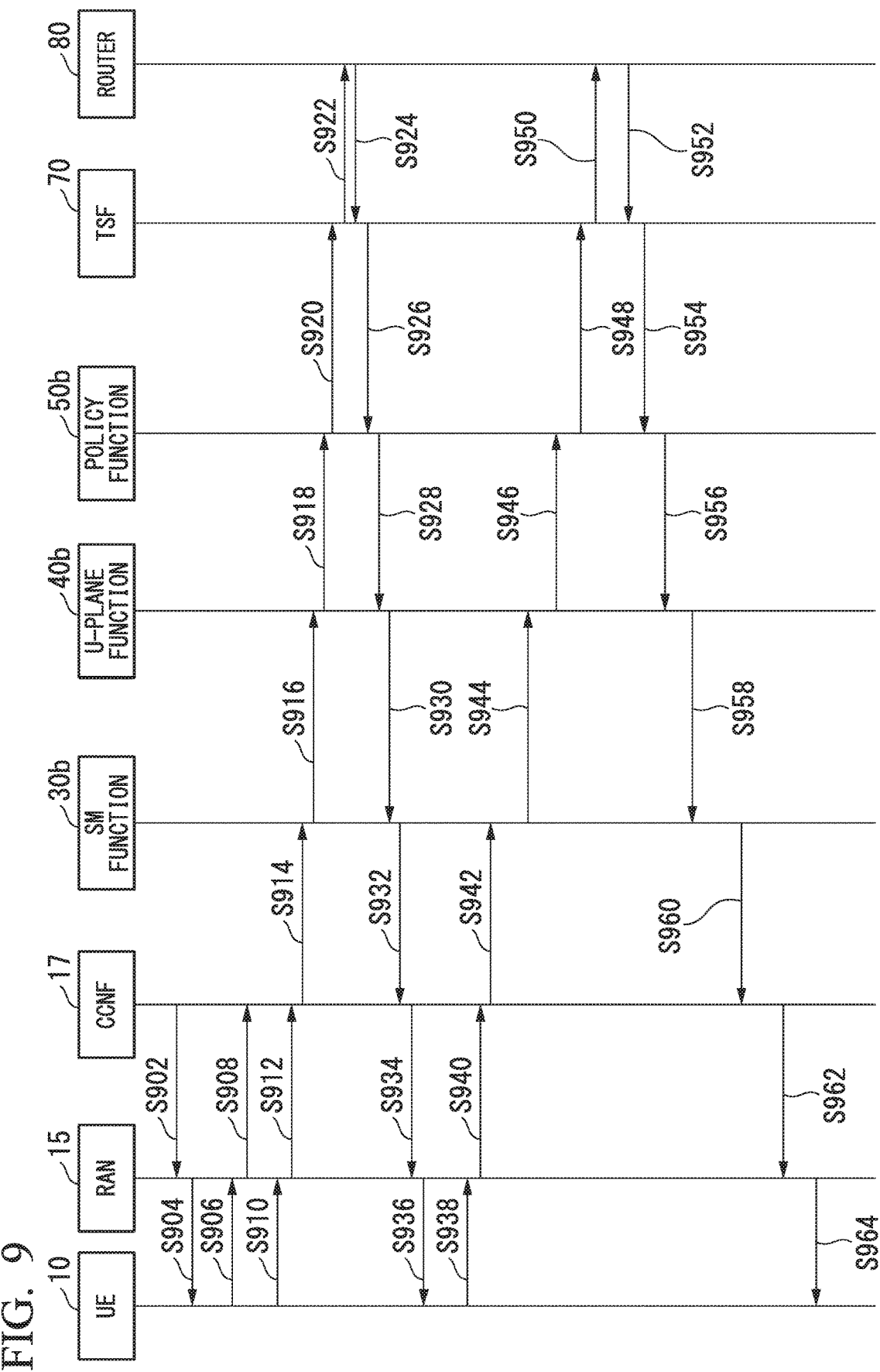
FIG. 9 is a sequence chart showing a (second) example of the operation of a communication system.

FIG. 9 shows a call flow in the related art in changing the network slice to which the UE 10 is connected from a source network slice to a destination network slice. According to FIG. 9, the CCNF 17 transmits a detach command and an attach command to the UE 10.

In steps S902-S904, the CCNF 17 transmits a switching command, which indicates a command to switch the network slice, to the UE 10.

In steps S906-S908, the UE 10 transmits a response to the switching command transmitted by the CCNF 17.

In step S910, the UE 10 transmits a detach request.

In steps S912 to S936, detach processing of the UE 10 is performed.

Steps S802-S828 of FIG. 8 can be applied to steps S938-S964.

In FIG. 9, the UE 10 is accommodated in SM, U-plane, and policy functions other than the connected SM, U-plane, and policy functions.

Figure 10:
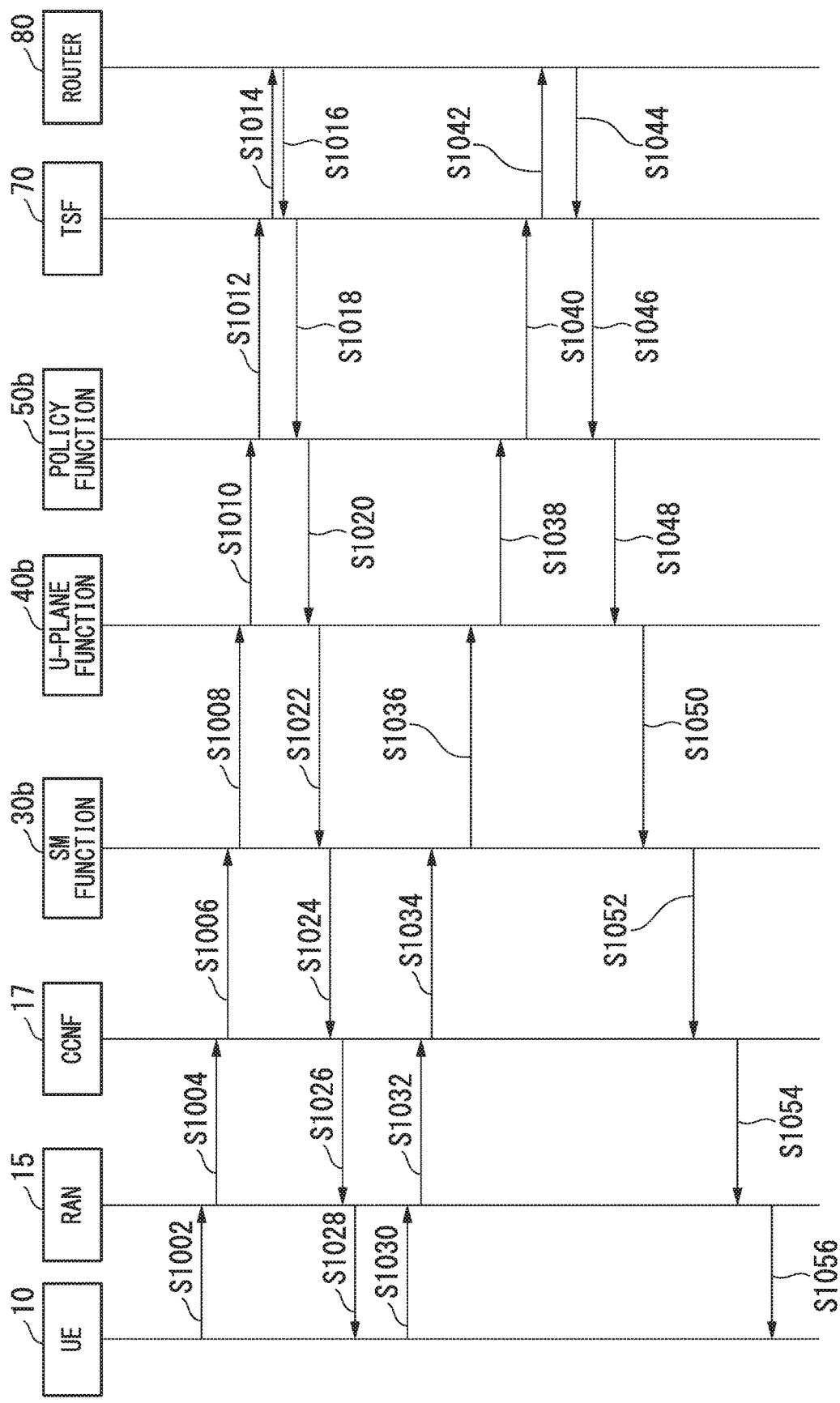
FIG. 10 is a sequence chart showing a (third) example of the operation of the communication system.

FIG. 10 shows a call flow in the related art in changing the connected network slice when the user of the UE 10 has changed a contract condition. According to FIG. 10, the UE 10 transmits a detach message.

Steps S910 to S964 of FIG. 9 can be applied to steps S1002 to S1056.

According to the communication system according to the embodiment, when switching the network slice 200a, to which the UE 10 is connected, to the network slice 200b, the common control server 150 notifies the network slice 200b of information indicating the RAN 1000 connected to the UE 10. With this configuration, it is possible to switch the network slice to which the UE 10 is connected from the network slice 200a to the network slice 200b without exchanging signaling messages between the UE 10 and the RAN 1000. Therefore, even when many UEs switch network slices 200 at the same time, it is possible to prevent occurrence of congestion.

When switching the network slice 200a, to which the UE 10 is connected, to the network slice 200b, the common control server 150 notifies the network slice 200b of the IP address that has been allocated to the UE 10 by the network slice 200a. With this configuration, the IP address of the LIE 10 is not changed when the network slice 200 is changed. Therefore, there is no possibility that the UE 10 cannot perform communication due to the change of the IP address or cannot receive services such as IMS services which require IP address registration processing beforehand.

Also, when switching the network slice 200 to which the UE 10 is connected, it is inquired whether or not each of the SM function 300, the U-plane function 400, and the policy function 500 included in the switching destination network slice 200b can accommodate the UE 10. Therefore, the operator can flexibly construct slices without being conscious of the node configurations of the switching destination network slice 200b and the switching source network slice 200a. Furthermore, even when a certain node present in the switching destination network slice 200b cannot accommodate the UE 10, it is possible to reply about this fact, and another node, which can accommodate the UE 10, in the switching destination network slice can be searched for and thus can accommodate the UE 10.

The above embodiment has been described with reference to the case in which two network slices 200a and 200b are provided, but the present invention is not limited to this example. For example, the number of network slices 200 may be three or more. For example, the network slices 200 may include a network slice 200 that provides a low delay service in addition to the network slices 200 that provide broadband and IoT services.

The above embodiment has been described with reference to the case in which three SEs 600a, 600b, and 600c are provided, but the present invention is not limited to this example. For example, the number of SEs 600 may be one or two or may be four or more.

The above embodiment has been described with reference to the case in which each network slice 200 includes an SM function 300, a U-plane function 400, and a policy function 500, but the present invention is not limited to this example. For example, the number of SM functions 300, the number of U-plane functions 400, and the number of policy functions 500 included in each network slice 200 may be two or more or may differ within the network slice 200. For example, each network slice 200 may also include functions other than SM function 300, the U-plane function 400, and the policy function 500.

The above embodiment has been described with reference to the case in which the communication system includes two UEs 10, but the present invention is not limited to this example. For example, one UE 10 may be included in the communication system, or three or more UEs 10 may be included in the communication system.

The above embodiment has been described with reference to the case in which, for each UE, it is inquired whether or not the UE can be accommodated in the SM function 300, the U-plane function 400, and the policy function 500 when the network slice 200 to which the UE is connected is switched, but the present invention is not limited to this example. For example, for a multiple UEs 10, it is possible to concurrently inquire whether or not they can be accommodated in the SM function 300, the U-plane function 400, and the policy function 500.

The above embodiment has been described with reference to the case in which it is determined that it is possible to accommodate the UE 10 when the UE 10 is included in the pre-registered UEs 10 and it is determined that it is not possible to accommodate the UE 10 when the UE 10 is not included in the pre-registered UEs 10, but the present invention is not limited to this example. For example, it may be determined that it is possible to accommodate the UE 10 when the IP address of the UE 10 is included in IP addresses scheduled to be allocated to the UE 10 and it may be determined that it is not possible to accommodate the UE 10 when the IP address of the UE 10 is not included in the scheduled IP addresses.

Although embodiments of the present invention and their modifications have been described above, these embodiments and modifications have been presented by way of example and are not intended to limit the scope of the invention. These embodiments and modifications can be implemented in various other forms, and various omissions, substitutions, changes, and combinations can be made without departing from the spirit of the invention. These embodiments and modifications are included in the scope or spirit of the invention as well as in the scope of the invention described in the claims and their equivalents.

Each of the common control server 150, the SM server 350, the U-plane server 450, and the policy server 550 described above has a computer system therein. The procedure of the processing of each device described above is stored in a computer-readable recording medium in the form of a program and the above processing is performed by a computer reading and executing the program. Here, the "computer-readable recording medium" refers to a magnetic disk, a magneto-optical disk, a CD-ROM, a DVD-ROM, a semiconductor memory, or the like. The computer program may also be delivered to a computer via a communication line and the computer which has received the program may execute the program.

Further, the program may be one for realizing some of the above-described functions. The program may also be a so-called differential file (differential program) which can realize the above-described functions in combination with a program already recorded in the computer system.

In the above embodiment, the selection function 1502 and the selector 160 are examples of the slice selector, the creation function 1504 and the creator 162 are examples of the creator, and the communication control function 1506 and the communication controller 164 are examples of the notification unit. The SM function 300 and the SM server 350 are examples of the SM function instance, the U-plane function 400 and the U-plane server 450 are examples of the U-plane function instance, and the selection function 3504 and the selector 362 are examples of the U-plane selector. The network slice 200a is an example of the first network slice and the network slice 200b is an example of the second network slice. The policy function 500 and the policy server 550 are examples of the policy function instance. The common control server 150, the SM server 350, the U-plane server 450, and the policy server 550 are examples of the communication device and the UE 10 is an example of the terminal device.

INDUSTRIAL APPLICABILITY

According to the embodiments of the present invention, it is possible to switch the network slice to which the UE is connected while limiting the consumption of wireless resources and without changing the 1P address and disconnection of the communication.

REFERENCE SIGNS LIST

10a, 10b Terminal device
20 Base station
100 Common control plane network function
200a, 200b Network slice
300a, 300b SM function
400a, 400b U-plane function
500a, 500b Policy function
600a, 600b, 600c SE
700 TSF
900 Internet
950 Rear network (rear NW)
150 Common control server
152 Communicator
154 Storage unit
156 Program
158 Controller
160 Selector
162 Creator
164 Communication controller
350 SM server
352 Communicator
354 Storage unit
356 Program
358 Controller
360 Determinator
362 Selector
364 Creator
366 Communication controller
450 U-plane server
452 Communicator
454 Storage unit
456 Program
458 Controller
460 Determinator
462 Selector
466 Communication controller
550 Policy server
552 Communicator
554 Storage unit
556 Program
558 Controller
560 Determinator
562 Creator
564 Communication controller 350a, 350b SM server
550a, 550b Policy server
1502 Selection function
1504 Creation function
1506 Communication control function
3502a, 3502b Determination function
3504a, 3504b Selection function
3506a, 3506b Creation function
3508a, 3508b Communication control function
4502a, 4502b Determination function
4504a, 4504b Selection function
4506a, 4506b Creation function
4508a, 4508b Communication control function
5502a, 5502b Determination function.
5504a, 5504b Creation function
5506a, 5506b Communication control function

The invention claimed is:

1. A communication system, comprising:
a memory that stores a program;
a processor that executes the program; and
multiple session manager function instances,
wherein the processor is configured to
select a second network slice, to which a first network slice to which a terminal device is connected is to be switched, from multiple network slices respectively, including multiple network functions, and select a session manager function instance to be connected to the terminal device from among the multiple session manager function instances included in the selected second network slice;
create setting information used in communication between the terminal device and the first network slice; and
notify, from a common control plane network function instance, the selected session manager function instance of the setting information that is created,
wherein the selected session manager function instance is configured to determine a route on which traffic is to be transferred, using the setting information that is notified.

2. The communication system according to claim 1, wherein the setting information is information indicating an IP address that has been allocated to the terminal device by the first network slice and a radio access network (RAN) to which the terminal device is connected.

3. The communication system according to claim 1, further comprising:
a user plane (U-plane) function instance included in the second network slice, the U-plane function instance being configured to set the route determined by the selected session manager function instance.

4. The communication system according to claim 1, further comprising:
multiple user plane (U-plane) function instances included in the second network slice, the U-plane function instances being configured to set the route determined by the selected session manager function instance; and
a U-plane selector included in the second network slice, the U-plane selector being configured to select a U-plane function instance for setting the route determined by the selected session manager function instance from the multiple U-plane function instances.

5. The communication system according to claim 3, wherein the selected session manager function instance is configured to notify the U-plane function instance for setting the route determined by the selected session manager function instance of information indicating a RAN to which the terminal device is connected.

6. The communication system according to claim 3, further comprising:
a policy function instance configured to manage quality of service (QoS) of a user,
wherein the U-plane function instance is configured to transmit information inquiring as to whether it is possible to accommodate the terminal device to the policy function instance, and
the policy function instance is configured to determine whether or not it is possible to accommodate the terminal device and to notify, upon determining that it is possible to accommodate the terminal device, a traffic steering function (TSF) of information indicating that the first network slice to which the terminal device is connected is switched to the second network slice.

7. The communication system according to claim 1, wherein the selected session manager function instance is configured to determine whether or not it is possible to accommodate the terminal device when notified of the setting information and to notify that it is not possible to accommodate the terminal device upon determining that it is not possible to accommodate the terminal device, and
the processor is configured to reselect the second network slice when notified that it is not possible to accommodate the terminal device by the selected session manager function instance.

8. A communication device, comprising:
a memory that stores a program; and
a processor that executes the program;
wherein the processor is configured to
select a second network slice, to which a first network slice to which a terminal device is connected is to be switched, from multiple network slices, respectively, including multiple network functions, and select a session manager function instance to be connected to the terminal device from among multiple session manager function instances included in the selected second network slice;
create setting information used in communication between the terminal device and the first network slice; and
notify, from a common control plane network function instance, the selected session manager function instance of the setting information that is created.

9. A non-transitory computer-readable recording medium storing a program causing a computer for a communication device to execute processing for:
selecting a second network slice, to which a first network slice to which a terminal device is connected is to be switched, from multiple network slices, respectively, including multiple network functions, and selecting a session manager function instance to be connected to the terminal device from among multiple session manager function instances included in the selected second network slice;
creating setting information used in communication between the terminal device and the first network slice; and
notifying, from a common control plane network function instance, the selected session manager function instance of the created setting information.

* * * * *

UNITED STATES PATENT AND TRADEMARK OFFICE
CERTIFICATE OF CORRECTION

PATENT NO. : 10,849,057 B2  
APPLICATION NO. : 16/329594  
DATED : November 24, 2020  
INVENTOR(S) : Takeshi Usui et al.

Page 1 of 1

It is certified that error appears in the above-identified patent and that said Letters Patent is hereby corrected as shown below:

On the Title Page

Page 2, Item (56) Other Publications, Column 2, Lines 7-8, the expression "Japanese an English translation thereof family" should correctly read -- Japanese family --.

Page 2, Item (56) Other Publications, Column 2, Line 14, the expression "seperated slices" should correctly read -- separated slices --.

Page 2, Item (56) Other Publications, the omitted citation -- China Office Action (with English Language Translation of Search Report), mailed August 28, 2020 by the China National Intellectual Property Administration, in Chinese Application No. 201780052731.2. -- should be added at the end of this section.

In the Claims

In Column 19, Line 25 (Claim 1, Line 8) the expression "slices respectively" should correctly read -- slices, respectively --.

Signed and Sealed this  
Eighth Day of June, 2021

Drew Hirshfeld  
*Performing the Functions and Duties of the*  
*Under Secretary of Commerce for Intellectual Property and*  
*Director of the United States Patent and Trademark Office*